(12) United States Patent
Deißmann et al.

(10) Patent No.: US 7,802,850 B2
(45) Date of Patent: Sep. 28, 2010

(54) ADJUSTABLE SEAT AND METHOD FOR USE

(75) Inventors: Bernd Deißmann, Remscheid (DE); Hans-Jürgen Caro, Wuppertal (DE); Piotr Szablewski, Wuppertal (DE)

(73) Assignee: Johnson Controls GmbH, Burscheid (DE)

( * ) Notice: Subject to any disclaimer, the term of this patent is extended or adjusted under 35 U.S.C. 154(b) by 806 days.

(21) Appl. No.: 10/571,185

(22) PCT Filed: Sep. 7, 2004

(86) PCT No.: PCT/EP2004/009955
§ 371 (c)(1),
(2), (4) Date: Feb. 14, 2007

(87) PCT Pub. No.: WO2005/025931
PCT Pub. Date: Mar. 24, 2005

(65) Prior Publication Data
US 2007/0236068 A1 Oct. 11, 2007

(30) Foreign Application Priority Data
Sep. 9, 2003 (DE) .................. 103 41 375

(51) Int. Cl.
*B60N 2/02* (2006.01)
(52) U.S. Cl. .............. 297/378.12; 297/378.1; 296/65.09; 296/65.17
(58) Field of Classification Search . 297/378.1–378.12; 296/65.03, 65.09, 65.17
See application file for complete search history.

(56) References Cited
U.S. PATENT DOCUMENTS 4,484,776 A   11/1984  Gokimoto et al.
5,482,349 A *  1/1996  Richter et al. .................. 297/15
6,000,742 A * 12/1999  Schaefer et al. ........... 296/65.09
6,012,755 A *  1/2000  Hecht et al. ............... 296/65.03
6,024,411 A *  2/2000  Pesta et al. .................... 297/325
6,131,999 A * 10/2000  Piekny et al. ........... 297/378.12
6,135,555 A * 10/2000  Liu et al. ..................... 297/336
6,174,017 B1 *  1/2001  Salani et al. ............. 296/65.03
6,520,581 B1 *  2/2003  Tame .......................... 297/336
6,729,689 B2 *  5/2004  Habedank .................... 297/335
6,793,285 B1 *  9/2004  Tame .......................... 297/336

(Continued)

FOREIGN PATENT DOCUMENTS

DE   297 15 345 U1    2/1999
DE   100 56 024 A1    6/2002
DE   101 36 244 C1    8/2002
DE   101 39 538 C1    3/2004
EP      0575733 A1   12/1993

OTHER PUBLICATIONS

International Search Report for PCT/EP2004/009955, date of mailing Dec. 28, 2004, 3 pages.

*Primary Examiner*—Laurie K Cranmer
(74) *Attorney, Agent, or Firm*—Foley & Lardner LLP

(57) ABSTRACT

A seat for a motor vehicle, includes a backrest part and a seat part. The backrest part is configured to fold relative to the seat part from a normal position into a folded position and vice-versa. A lower seat structure is included and the seat is configured to move relative to the lower seat structure. At least one front first fastening, one rear second fastening and one diagonal fastening are provided to fasten the seat part to the lower seat structure. The seat is configured to adjust at least into an entry position and into a lowered position distinguishable from the normal position, and the second fastening is configured to release in the entry position. The diagonal fastening is configured to release in the lowered position.

15 Claims, 6 Drawing Sheets

U.S. PATENT DOCUMENTS 6,817,669 B2 * 11/2004 Roth et al. .................. 297/340
6,857,703 B2 * 2/2005 Bonk .................... 297/378.14
2004/0195892 A1 * 10/2004 Daniels ................... 297/378.1
2004/0262971 A1 * 12/2004 Hentges et al. ........ 297/378.12

* cited by examiner

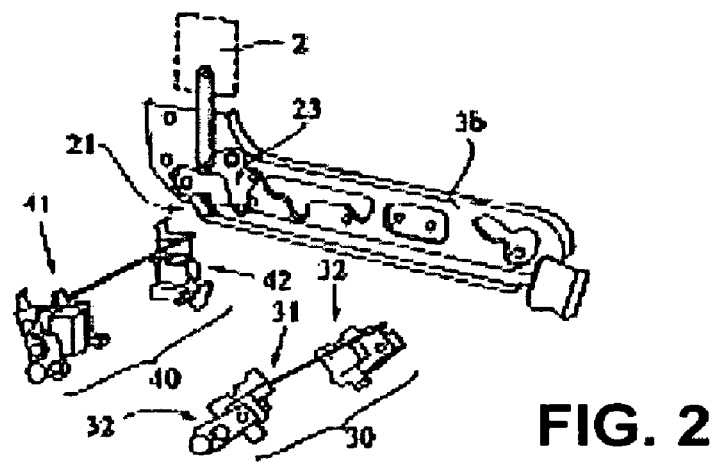
FIG. 2
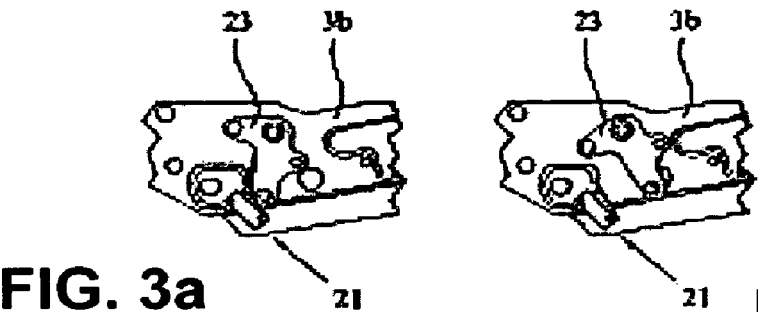
FIG. 3a   FIG. 3b
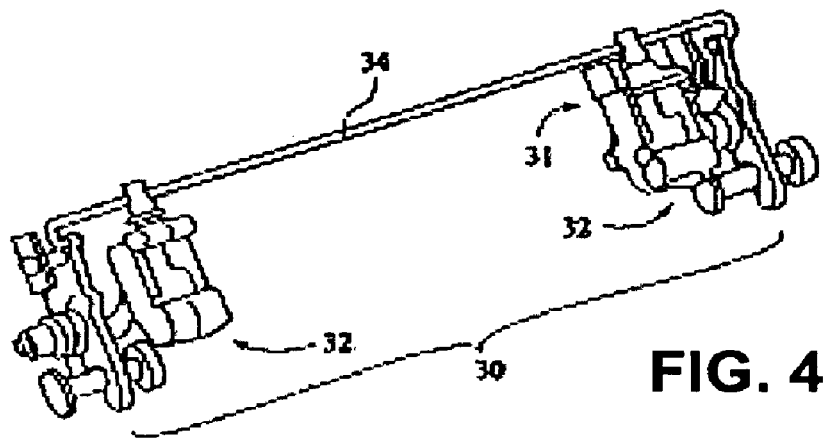
FIG. 4

FIG. 7a
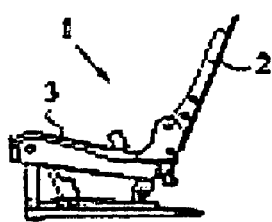
FIG. 7b      FIG. 7c      FIG. 7d
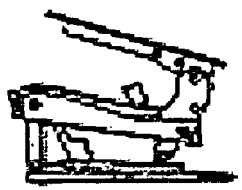  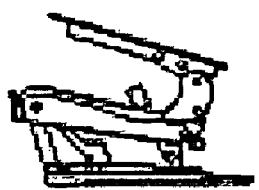  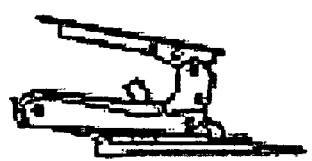
FIG. 7e      FIG. 7f      FIG. 7g
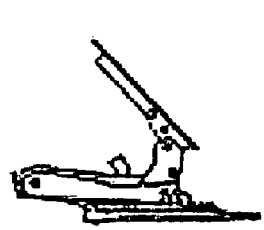  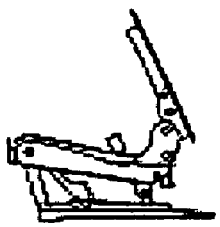  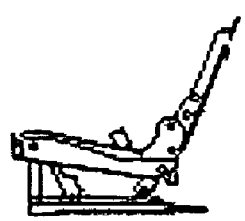

FIG. 8a
FIG. 8b
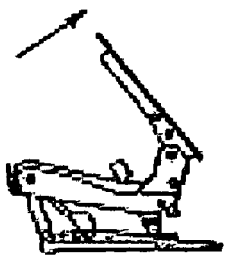
FIG. 8c
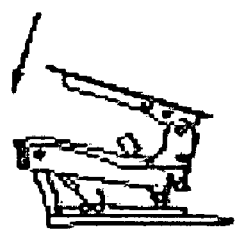
FIG. 8d
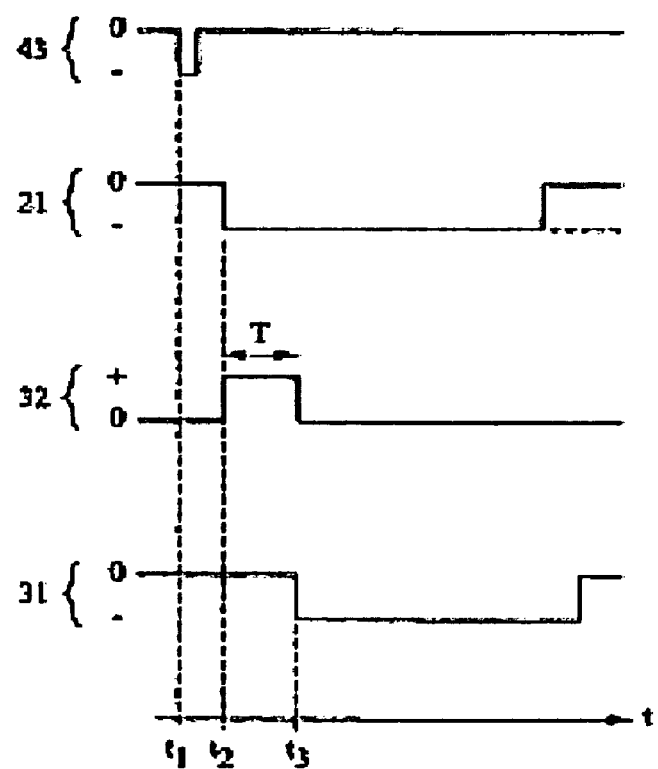
FIG. 9

ADJUSTABLE SEAT AND METHOD FOR USE

CROSS-REFERENCE TO RELATED PATENT APPLICATIONS

The present Application is a National Stage of Application PCT/EP2004/009955 entitled, "Seat and Method" filed on Sep. 7, 2004 which published under PCT Article 21(2) on Mar. 24, 2005 as WO 2005/025931 A1 in the German language, which claims priority to German Patent Application No. DE 103 41 375.8 filed on Sep. 9, 2003, the disclosures of which are incorporated herein by reference in their entirety.

BACKGROUND

The invention relates to an adjustable seat for a vehicle.

In particular for motor vehicles, it is increasingly desirable to provide assemblies which satisfy the comfort needs of their users. In the case of seats for motor vehicles one example is a seat providing entry into a motor vehicle for users of the motor vehicle who would like to sit on the rear seat bench of the vehicle. The backrest of a seat situated in front of the rear seat bench is to be folded forward, i.e. away from the rear seat bench. For vehicles, especially vans or SUVs suitable for families, it is advantageous to include multiple functions and positions in the design of vehicle seats. For example, the backrest of a seat of this type can be folded forward in such a manner that the rear side of the backrest can be used as a table. It is generally known to use vehicle seats which, in particular in vehicles which do not have separate doors as access to a rear seat bench. Vehicle seats have a backrest in such a manner that the backrest of the vehicle seat is folded forward for more comfortable entry of passengers to the rear seat bench. In particular, some vehicles do not have separate doors to access the a rear seating. In the normal position the seat is locked. A mechanical unlocking device is generally actuated manually, so that the backrest, which is provided in a manner such that in its normal position it is locked in a certain, settable angle of inclination with respect to the seat surface, can be folded forward. It is disadvantageous in this case that the entire lower seat structure sticks in the same position, i.e. remains at the same location, as it would continue to obstruct the entry of the passengers.

SUMMARY

In one exemplary embodiment, a seat for a motor vehicle includes a seat part and a backrest part configured to fold relative to the seat part between a normal position and a folded position. A lower seat structure is included and the seat part is configured to move relative to the lower seat structure. Also included is at least one front first fastening connected to a rear second fastening by a diagonal fastening to fasten the seat part to the lower seat structure. The seat is configurable to adjust at least into an entry position and into a lowered position distinguishable from the normal position and the second fastening is configured to release in the entry position. The diagonal fastening is configured to release in the lowered position.

In another exemplary embodiment, a seat for a motor vehicle, includes a seat part, a backrest part foldably coupled with respect to the seat part, a first fastener coupled to the seat part, a second fastener coupled to the seat, a diagonal fastener commonly coupled to the first and second fasteners, a lower seat structure coupled to the first and second fastener, and a first monitor configured to selectively prevent the diagonal fastener from being released when the seat is in the entry position. The second fastener is configured to selectively release the seat part from the lower seat structure and enable the seat to be in an entry position. The diagonal fastener is configured to selectively longitudinally displace the seat part into a lowered position.

In another exemplary embodiment, there is provided a seat with a backrest part and a seat part, the backrest part being provided in a manner such that it can be folded relative to the seat part from a normal position into a folded position and vice-versa. The seat has a lower seat structure. The seat part is provided in a manner such that it is movable relative to the lower seat structure. Furthermore, in order to fasten the seat part to the lower seat structure, at least one front first fastening, one rear second fastening and one diagonal fastening are provided. The seat can be adjusted at least into an entry position and into a lowered position apart from a normal position. A second fastening is provided and is configured to be released in the entry position. The diagonal fastening can be released in the lowered position. This results in the maximum amount of setting possibilities leading to an increase in the ease of operation during the use of the seat.

In a preferred embodiment, the entry position of the seat part is provided in a manner such that it is separated in the region of the second fastening from the lower seat structure, and/or in the lowered position the diagonal fastening is provided in a manner such that it is displaced longitudinally in relation to its setting in the normal position. This affords the advantage that the location at which the seat part is in its normal position can be released for use by an occupant. Furthermore, this affords the advantage that the seat can be lowered and even in the case with a relatively thick backrest of the seat, the backrest can be used as a table.

Furthermore, it is advantageous that, in order to separate the seat part in the region of the second fasting, a second actuator is provided to longitudinally displace the diagonal fastening. The actuators in one embodiment are electric motor actuators; therefore, various settings of the seat can be made possible in an automated or controlled manner and a direct unlocking by a user is unnecessary. For example, there is no need to fiddle around at less accessible points. The present adjustable seat simplifies the construction of the seat and therefore makes it less expensive because no awkward and weight-increasing handles, levers or other actuating devices have to be provided.

The first monitor or monitoring means prevents the diagonal fastening from being released in the entry position. The second monitor or monitoring means prevents the second fastening from being released in the lowered position.

A trigger or triggering means is provided with the backrest in its folded position, to the diagonal fastening or the second fastening to release only during a predetermined time interval. As a result, misuses of the seat use are further restricted.

The first monitoring means, the second monitoring means and/or the triggering means are provided as microswitches. By this means, it is possible in a particularly simple and cost-effective manner to provide the monitoring means.

The seat has a control device for controlling the release of the fastenings as a function of the position taken up by the seat. By using the control device, for example, a programmable control device, it is possible to rule out a misuse of the various adjustment possibilities of the seat.

A method is provided in which a seat is controlled in such a manner that it has a maximum amount of setting possibilities which can be selected by the user and at the same time a misuse of this increased functionality is restricted.

BRIEF DESCRIPTION OF THE DRAWINGS

The invention is explained in more detail below with reference to exemplary embodiments illustrated in the drawings.

FIG. 2 shows various components of the seat according to one exemplary embodiment.

FIG. 3a-b show a side part of the seat with attached triggering means according to one exemplary embodiment.

FIG. 4 shows a diagonal fastening according to one exemplary embodiment.

FIGS. 7a-g show a sequence of positions of the seat with respect to the lowered position according to one exemplary embodiment.

FIGS. 8a-d show a first sequence of partially misusable positions of a seat.

FIG. 9 shows a logic diagram for the monitoring algorithm of FIG. 8 according to one exemplary embodiment.

DETAILED DESCRIPTION

Figure 1A:
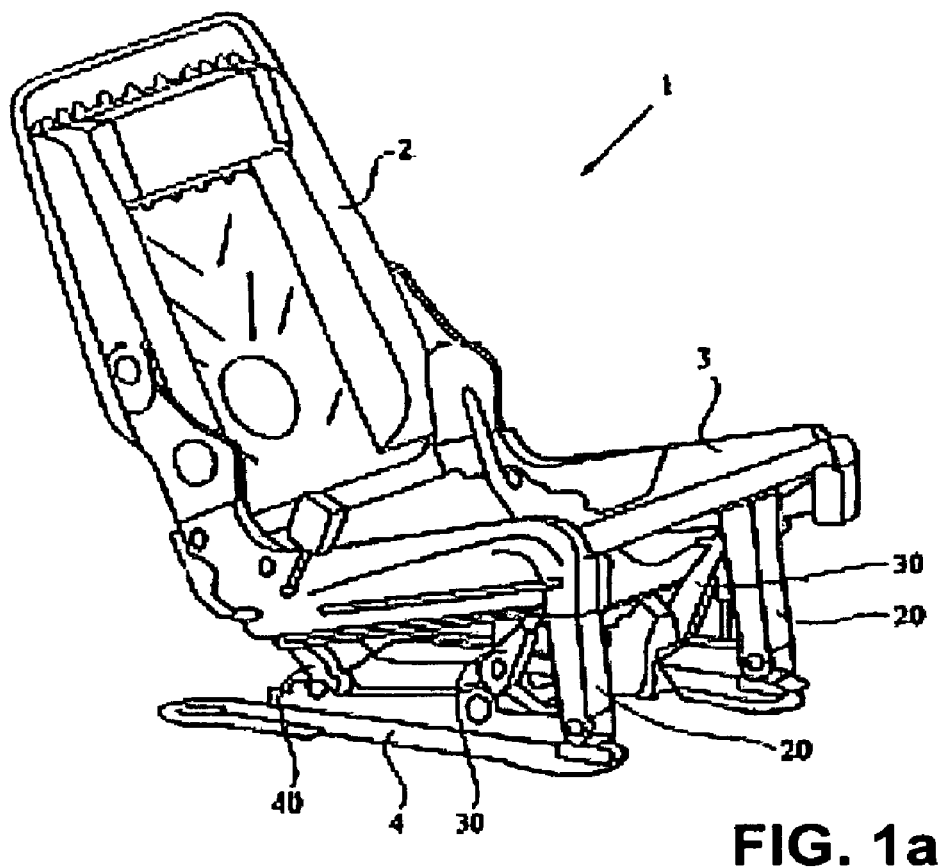
FIG. 1a shows a seat with a backrest part and a seat part according to one exemplary embodiment.

FIG. 1a shows a vehicle seat 1 with a backrest part 2 and a seat part 3. The seat part 3 is connected to a lower seat structure 4 via a front first fastening 20, a rear second fastening 40 and a diagonal fastening 30. The seat 1 is largely symmetrical with respect to its longitudinal axis, so that, in the illustrated exemplary embodiment both the front first fastening 20, the second fastening 40 and the diagonal fastening 30 are provided both on the left side and on the right side of the seat 1. The fastenings 20, 30 and 40 are discussed in detail below without differentiating the two sides of the seat 1. Each side of a particular fastening 20, 30 and 40 may be similarly utilized.

Figure 1B:
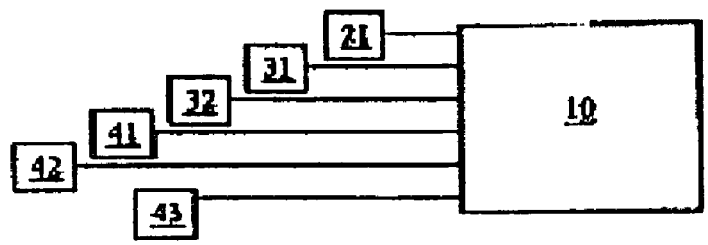
FIG. 1b is a control according to one exemplary embodiment.

FIG. 1b illustrates the control 10 connected to a triggering means 21, a first monitoring means 31, a first actuator 32, a second monitoring means 41, a second actuator 42 and an actuating means 43. The control 10 governs the actuators 32, 42 of the second fastening 40 and of the diagonal fastening 30, respectively, through the triggering means 21, the monitoring algorithm (or means) 31, 41 and of the actuating means 43 (i.e., it is a function of the existing locking and/or unlocking state of the seat).

FIG. 2 illustrates various components of the seat. A lateral frame 3b is illustrated, to which the triggering means 21 is coupled. Furthermore, the second fastening 40 and the diagonal fastening 30 are illustrated. The second fastening 40 includes the second actuator 42 and the second monitoring means 41. The diagonal fastening 30 includes the first actuator 32 and the first monitoring means 31. Also indicated is an actuating part 23 which is connected to the backrest part 2, movable by movement of the backrest part 2, and actuates the triggering means 21 when the backrest part 2 is folded forward.

FIGS. 3a-b illustrate the side part 3b of the seat part 3 with attached triggering means 21. The actuating means 23, which moves as a function of the position of the backrest part 2, interacts with the triggering means 21 in such a manner that the triggering means 21 signals a forward folding of the backrest part 2 into its folded position. In FIG. 3b, the actuating part 23 is provided corresponding to the normal position of the backrest part 2, so that the actuating part 23 does not interact with the triggering means 21 and does not signal the folded position of the backrest part 2.

FIG. 4 illustrates the diagonal fastening 30 with its first actuator 32, its first monitoring means 31 and an adjusting clip 34 on which the first actuator 32 acts. When the first actuator 32 acts on the adjusting clip 34 of the diagonal fastening 30, the diagonal fastening 30 is released and can be longitudinally displaced.

Figure 5:
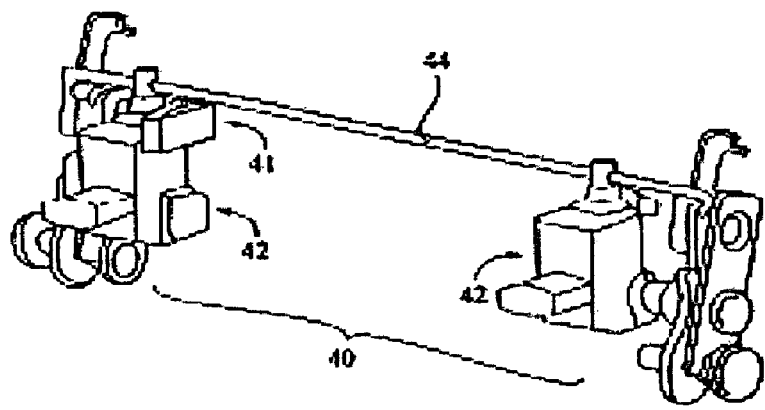
FIG. 5 shows a second fastening according to one exemplary embodiment.

FIG. 5 illustrates the second fastening 40. The second fastening 40 includes the second actuator 42, the second monitoring means 41, and likewise an adjusting clip 44 on which—analogously to the diagonal fastening 30—the second actuator 42 acts. When the second actuator 42 acts on the adjusting clip 44 of the second fastening 40, the second fastening 40 can release the seat part 3 relative to the lower seat structure 4. The seat 1 or the backrest part 2 together with the seat part 3 are provided in a manner such that it can rotate about the front first fastening 20 or about an axis of rotation in the region of the front first fastening 20.

Figures 6A, 6B, 6C:
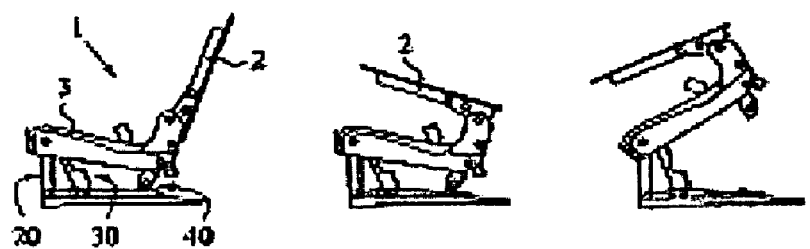
FIGS. 6a-g show a sequence of positions of the seat with respect to the entry position according to one exemplary embodiment.
Figures 6D, 6E, 6F:
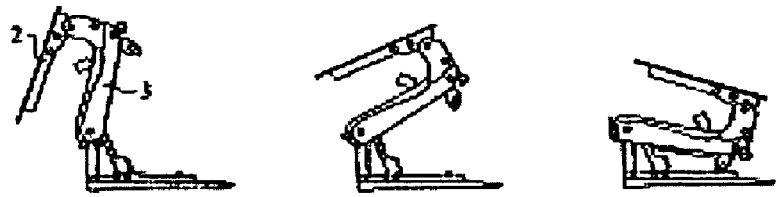
Figure 6G:

FIGS. 6a-g show a sequence of positions of the seat 1 illustrating the setting of the seat 1 from its normal position into its entry position and back into its normal position. FIG. 6a illustrates the seat 1 in its normal position. The seat 1 is illustrated with a backrest part 2 folded forward in FIG. 6b. By folding the backrest part 2 forward, the triggering means 21 is activated, so that the second actuator 42 can provide a release of the seat part 3 in the region of the second fastening 40, as illustrated in FIG. 6c. FIG. 6d illustrates the entry position of the seat 1. It can be seen that at the point at which the seat part 3 is in the normal position there is sufficient space in order to make it possible for a user to comfortably enter a motor vehicle. FIGS. 6a-g illustrate the movement of the seat 1 or of its backrest part 2 and its seat part 3 back into the normal position, with a latching of the second fastening 40 (as shown on FIG. 6f) so that the seat part 3 is again connected fixedly to the lower seat structure 4. FIG. 6g illustrates the seat 1 in its normal position.

FIG. 7a-g illustrate a sequence of positions of the seat 1 according to the invention in order to illustrate the setting of the seat 1 from its normal position into its lowered position and back into its normal position. The designation of the various components of the seat has been omitted in each case of these partial figures for the sake of simplicity. FIG. 7a illustrates the seat 1 in its normal position. According to the invention, provision is made for a user to be able to initiate the setting of the lowered position by the actuating means 43 which is connected to the control 10 but which is not illustrated in the Figures (not withstanding FIG. 1b). To this end, the user actuates the actuating means 43 (for example via a push-button switch, touch screen or the like) a signal is sent to the control 10 that the user intends to set the seat 1 into the lowered position. The actuation of the actuating means 43 therefore makes it possible to differentiate between the user's desire to set the seat into the entry position and into the lowered position. The seat 1 is illustrated in FIG. 7b with a backrest part 2 folded forward. By folding the backrest part 2 forward, the triggering means 21 is activated, so that—because of the actuation of the actuating means 43 which has previously taken place—the first actuator 32 can permit a longitudinal displacement of the diagonal fastening 30. The beginning of the lateral fastening is illustrated in FIG. 7c and the complete displacement of the lateral fastening is illustrated in FIG. 7d. FIG. 7d illustrates the lowered position of the seat 1. The parallelogram-formed by the first fastening 20 and the second fastening 40 is obtained by a diagonal fastening 30 being latched, i.e. locked, in the normal position of the seat 1. In the lowered position of the seat 1 by unlocking the diagonal fastening 30, a longitudinal displacement of the same is possible, which—by a corresponding manual user operation—leads to the parallelogram collapsing. FIG. 7e illustrates the movement of the seat 1 (or of its backrest part 2 and its seat part 3 back) into the normal position. In turn, (as shown in FIG. 7) a longitudinal displacement of the diagonal part takes place leading to the diagonal fastening 30 latching into place in a position corresponding to the normal position of the seat 1 as shown in FIG. 7g.

FIG. 8a-d illustrate a first sequence of positions of a seat in order to show the setting of the seat from the lowered position. In the lowered position of the seat 1 as illustrated in FIG. 8a, the diagonal fastening 30 is set in a manner such that it is displaced longitudinally. The backrest part 2 is set upright (as in FIG. 8b)—with the triggering means 21 being switched off—and is subsequently set again into its folded position (as in FIG. 8c). It is possible that by release of the second fastening 40 (as in FIG. 8d) folding the seat 1 forward about an axis of rotation situated in the region of the first fastening 20 is conceivable in spite of the diagonal fastening 30. The seat is, of course, unlocked in the lowered position. According to the exemplary embodiment, misuse of the setting possibilities is prevented by the first monitoring means 31 being attached to the diagonal fastening 30 and being actuated by the diagonal fastening 30 when in the lowered position and actuated, thereby preventing the second fastening from being released, i.e. preventing an actuation of the second actuator 42.

FIG. 9 illustrates the monitoring principle illustrated in FIG. 8 for preventing the misuse according to one exemplary embodiment. FIG. 9 illustrates four rows which indicate states of various components of the seat 1 according to one exemplary embodiment. Each row indicates the state of the particular component at a point in time, t. The designation "0" indicates the corresponding component is inactive or is not actuated. The first row relates to the actuating means 43, the second row relates to the triggering means 21, the third row relates to the first actuator 32 and the fourth row relates to the first monitoring means 31. At a first time, t1, the actuating means 43 is activated by user actuation. Consequently, the backrest part 2 is set into its folded position. When the folded position is reached, the triggering means 21 is activated as a result by means of the actuating part 23 at the second time, t2. By the actuation of the triggering means 21, the control 10 activates the first actuator 32 during a predetermined time interval, T, of 500 ms (for example) in order to make it possible to reach the lowered position. If the first actuator 32 has released the adjusting clip 34 of the diagonal fastening 30, the first monitoring means 31 is activated at a third time, t3. The control 10 is provided in such a manner that a subsequent activation of the second actuator 42 does not take place for as long as the first monitoring means signals an unlocking of the diagonal fastening 30. This also applies to the situation in which the triggering means 21 is again actuated and in principle could bring about a release of the second fastening 40 by activation of the second actuator 42.

Figure 10A:
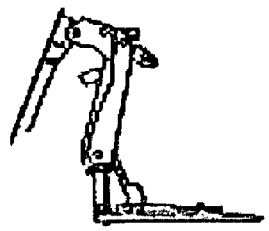
FIGS. 10a-d show a second sequence of partially misusable positions of a seat according to one exemplary embodiment.
Figure 10B:
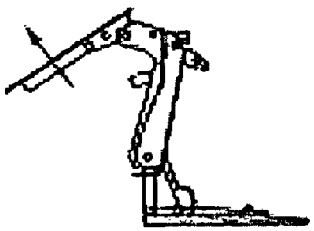
Figure 10C:
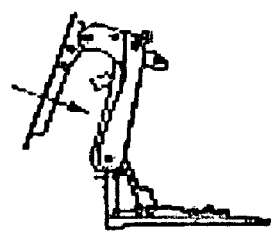
Figure 10D:
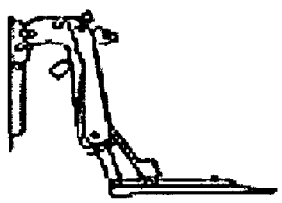

FIGS. 10a-d illustrate a second sequence of positions of a seat in order to illustrate the setting of the seat from the entry position into an unpermitted position. In the entry position of the seat 1 that is illustrated in FIG. 10a, the second fastening 40 is provided in a manner such that it is released, i.e. the backrest part 2 and the seat part 3 can be folded forward about an axis of rotation situated in the region of the first fastening 20. If, in this situation, the backrest part 2 is set upright (as shown in FIG. 10b)—with the triggering means 21 being switched off—and is subsequently set again into its folded position (as shown in FIG. 10c)—it is possible, by the release of the diagonal fastening 30 (as shown in FIG. 10d), for a longitudinal displacement of the diagonal fastening 30 to be conceivable in spite of the second fastening 40 not being in the entry position. Such a misuse of the setting possibilities is prevented by the second monitoring means 41 being attached to the second fastening 40 and being actuated by the second fastening 40 being released in the entry position and, when actuated, preventing the diagonal fastening 30 from being released, i.e. preventing an activation of the first actuator 32.

Figure 11:
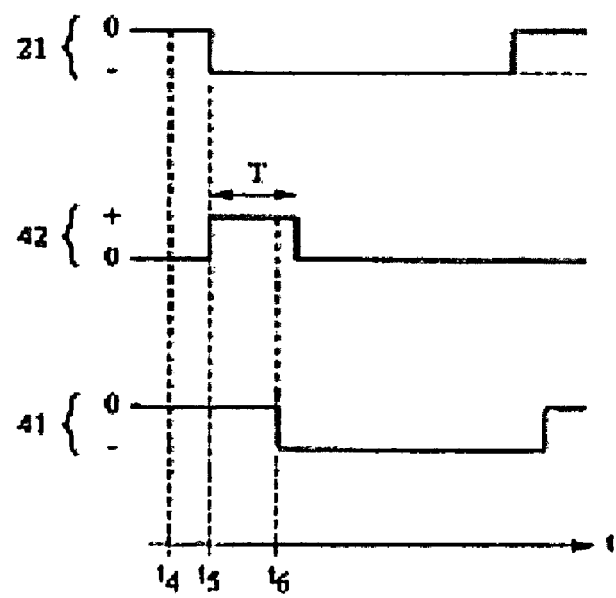
FIG. 11 shows a logic diagram for the monitoring algorithm of FIG. 10 according to one exemplary embodiment.

FIG. 11 illustrates the monitoring principle illustrated in FIGS. 10a-d for preventing the misuse of a seat 1 according to the invention. FIG. 11 illustrates three rows which indicate states of various components of the seat 1. Each row illustrates the time profile, t, of the state of the particular component. The designation "0" means, in this case, that the corresponding component is inactive or is not actuated. The first row relates to the triggering means 21, the second row relates to the second actuator 42 and the third row relates to the second monitoring means 41. At a fourth time, t4, the backrest is adjusted by unlocking the backrest part 2. Consequently, the backrest part 2 is set into a folded position. When the folded position is reached, the triggering means 21 is activated by means of the actuating part 23 at the fifth time, t5. By means of the actuation of the triggering means 21, the control 10 activates the second actuator 42 during a predetermined time interval, T, of 500 ms (for example) in order to make it possible to reach the entry position. If the second actuator 42 has released the adjusting clip 44 of the second fastening 40, the second monitoring means 41 is activated at a sixth time, t6. The control 10 is provided in such a manner that a subsequent activation of the first actuator 32 does not take place for as long as the second monitoring means 41 signals an unlocking of the second fastening 40. This also applies to the situation in which the triggering means 21 is actuated again and in principle could bring about a release of the diagonal fastening 30 by activation of the first actuator 32.

In one exemplary embodiment, the triggering means 21 and the monitoring means 31, 41 are provided as contact switches or as microswitches which are switched mechanically by the movement of certain components. The actuating part 23 for actuating the triggering means 21 is representative of these components. In this connection, provision can be made for some of the triggering or monitoring means 21, 31, 41 to carry out a monitoring of the state while others carry out a monitoring of change. For example, provision is made according to the invention for the triggering means 21 to react to flanks or to be evaluated by the control device 10 with respect to "flanks" of its signal while the first and second monitoring means 31, 41 only react to detected or assumed states, i.e. they are evaluated by the control device 10 exclusively in respect of signals at a particular moment. The evaluation of the monitoring means 31, 41 is independent of the movement history of the seat and therefore an increased robustness of the system is provided in the case of current failures, for example.

The distinction between the setting of the lowered position or of the entry position from the normal position can also take place by a selection switch provided; the one setting possibility represents the setting of the lowered position and the other setting possibility represents the setting of the entry position. As a result, a user of the seat can set these two positions unambiguously and separately or initiate the setting thereof.

It should be understood that the construction and arrangement of the elements of the vehicle seat in the exemplary embodiments are illustrative only. Although several embodiments of the seat have been described in detail in this disclosure, many modifications are possible without materially departing from the novel teachings and advantages of the subject matter recited in the claims. Accordingly, all such modifications are intended to be included within the scope of the present vehicle as defined in the appended claims. Unless specifically otherwise noted, the claims reciting a single particular element also encompass a plurality of such particular elements. Moreover, claims reciting that one element is coupled to another should be interpreted to mean that the elements are selectively coupled to each other and may be uncoupled or disconnected at any point. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

The invention claimed is:

1. A seat for a motor vehicle, comprising:
   a seat part;
   a backrest part configured to fold relative to the seat part between a normal position and a folded position; and
   a lower seat structure, the seat part being configured to move relative to the lower seat structure;
   wherein the seat part is connected to the lower seat structure via at least a front first fastening, a rear second fastening, and a diagonal fastening;
   wherein the seat is configurable to adjust at least into an entry position and into a lowered position distinguishable from the normal position;
   wherein the second fastening is configured to be released in the entry position; and
   wherein the diagonal fastening is configured to be released in the lowered position.

2. The seat of claim 1, wherein the seat part, when in the entry position, is configured to separate from the lower seat structure at the second fastening.

3. The seat of claim 1, wherein the seat part, when in the lowered position, is configured to be displaced longitudinally from the diagonal fastening with respect to a position of the seat part in the normal position.

4. The seat of claim 1, further comprising:
   a first actuator configured to longitudinally displace the diagonal fastening; and
   a second actuator configured to separate the seat part at the second fastening;
   wherein the first and second actuators are electrically operated.

5. The seat of claim 1, further comprising:
   a triggering means coupled to the backrest;
   wherein the triggering means is configured to release any one of the diagonal fastening and the second fastening during a predetermined time interval when the seat is in the folded position.

6. The seat of claim 1, further comprising a control device configured to control release of any one of the front first fastening, the rear second fastening, and the diagonal fastening as a function of a locking state of the seat.

7. The seat of claim 1, wherein the seat part is directly connected to the lower seat structure via at least the front first fastening, the rear second fastening, and the diagonal fastening.

8. A seat for a motor vehicle, comprising:
   a seat part;
   a backrest part configured to fold relative to the seat part between a normal position and a folded position;
   a lower seat structure, the seat part being configured to move relative to the lower seat structure;
   at least one front first fastening connected to a rear second fastening by a diagonal fastening to fasten the seat part to the lower seat structure, wherein the seat is configurable to adjust at least into an entry position and into a lowered position distinguishable from the normal position; and
   a first monitor configured to prevent the diagonal fastening from being released when the seat is in the entry position;
   wherein the second fastening is configured to be released in the entry position; and
   wherein the diagonal fastening is configured to be released in the lowered position.

9. The seat of claim 8, further comprising a second monitor configured to prevent the second fastening from being released when the seat is in the lowered position.

10. The seat of claim 9, further comprising:
    a trigger coupled to the backrest;
    wherein the trigger is configured to release any one of the diagonal fastening and the second fastening during a predetermined time interval when the seat is in the folded position.

11. The seat of claim 10, wherein any one of the first monitor, the second monitor and the trigger is a microswitch.

12. A seat for a motor vehicle, comprising:
    a seat part;
    a backrest part foldably coupled with respect to the seat part;
    a first fastener coupled to the seat part;
    a second fastener coupled to the seat;
    a diagonal fastener commonly coupled to the first and second fasteners;
    a lower seat structure coupled to the first and second fasteners; and
    a first monitor configured to selectively prevent the diagonal fastener from being released when the seat is in an entry position; and
    wherein the second fastener is configured to selectively release the seat part from the lower seat structure and to enable the seat to be in the entry position; and
    wherein the diagonal fastener is configured to selectively longitudinally displace the seat part into a lowered position.

13. The seat of claim 12, further comprising:
    a second monitor configured to selectively prevent the second fastener from being released when the seat is in the lowered position.

14. The seat of claim 12, further comprising:
    a trigger coupled to the backrest;
    wherein the trigger is configured to release any one of the diagonal fastener and the second fastener during a predetermined time interval.

15. The seat of claim 14, wherein any one of the first monitor, the second monitor and the trigger are microswitches.

* * * * *